US012743087B2

(12) United States Patent
Shimamoto et al.

(10) Patent No.: US 12,743,087 B2
(45) Date of Patent: Sep. 22, 2026

(54) CONTROL DEVICE FOR VEHICLE

(71) Applicant: HONDA MOTOR CO., LTD., Tokyo (JP)

(72) Inventors: Gaku Shimamoto, Tokyo (JP); Jumpei Noguchi, Tokyo (JP); Ayumu Mitomo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 18/420,119

(22) Filed: Jan. 23, 2024

(65) Prior Publication Data

US 2024/0255952 A1 Aug. 1, 2024

(30) Foreign Application Priority Data

Jan. 27, 2023 (JP) ................................ 2023-011061

(51) Int. Cl.
*G05D 1/223* (2024.01)
*G05D 109/10* (2024.01)

(52) U.S. Cl.
CPC ......... *G05D 1/223* (2024.01); *G05D 2109/10* (2024.01)

(58) Field of Classification Search
None
See application file for complete search history.

(56) References Cited

U.S. PATENT DOCUMENTS

2016/0148450 A1 5/2016 Ohshima
2017/0129427 A1 5/2017 Park et al.
2018/0144566 A1 5/2018 Ohshima
2021/0400481 A1 12/2021 Narumi et al.

FOREIGN PATENT DOCUMENTS

CN 109391470 A * 2/2019 ............. B60R 25/25
JP 4754883 B2 8/2011
JP 2016-097927 A 5/2016
JP 2020-107074 A 7/2020
JP 6884181 B2 * 6/2021 ............. H04L 67/52
JP 2023-049595 A 4/2023

OTHER PUBLICATIONS

CN 109391470 A—Merged Original and Translation (Year: 2019).*
JP 6884181 B2—Merged Original and Translation (Year: 2021).*
Jun. 4, 2024, Translation of Japanese Office Action issued for related JP Application No. 2023-011061.

* cited by examiner

*Primary Examiner* — Abdhesh K Jha
*Assistant Examiner* — Elizabeth Galyn Martinez
(74) *Attorney, Agent, or Firm* — Paratus Law Group, PLLC

(57) ABSTRACT

A control device for a vehicle includes: a processor configured to start the vehicle in response to operation of one of a plurality of types of keys. The processor is accessible to a storage unit in which terminal information of a terminal for remotely controlling the vehicle is stored in association with the vehicle, the processor is configured to control autonomous movement of the vehicle in response to an operation of the terminal whose terminal information is stored in the storage unit, and the processor is configured to perform limitation of the terminal information in the storage unit based on the type of the key used to start the vehicle.

8 Claims, 3 Drawing Sheets

| TYPE OF KEY USED TO START VEHICLE | | STORAGE OF TERMINAL INFORMATION | DELETION OF TERMINAL INFORMATION |
|---|---|---|---|
| PHYSICAL KEY | | ○ | ○ |
| MAIN ELECTRONIC KEY | | ○ | ○ |
| SUB-ELECTRONIC KEY | NON-ONE-TIME KEY | ○ | × |
| | ONE-TIME KEY | × | × |

1
SENSOR GROUP (EXTERNAL SENSOR)
FRONT CAMERA
REAR CAMERA
LEFT SIDE CAMERA
RIGHT SIDE CAMERA
FRONT SONAR GROUP
REAR SONAR GROUP
LEFT SIDE SONAR GROUP
RIGHT SIDE SONAR GROUP
θa
θb
V
OPERATION DETECTION UNIT
10
11a
11b
11c
11d
12a
12b
12c
12d
13a
13b
14
15
OPERATION INPUT UNIT
80
30
CONTROL DEVICE
INPUT AND OUTPUT UNIT
31
CALCULATION UNIT
32
STORAGE UNIT
35
COMMUNICATION UNIT
50
EXTERNAL DEVICE
2
(CONT.)

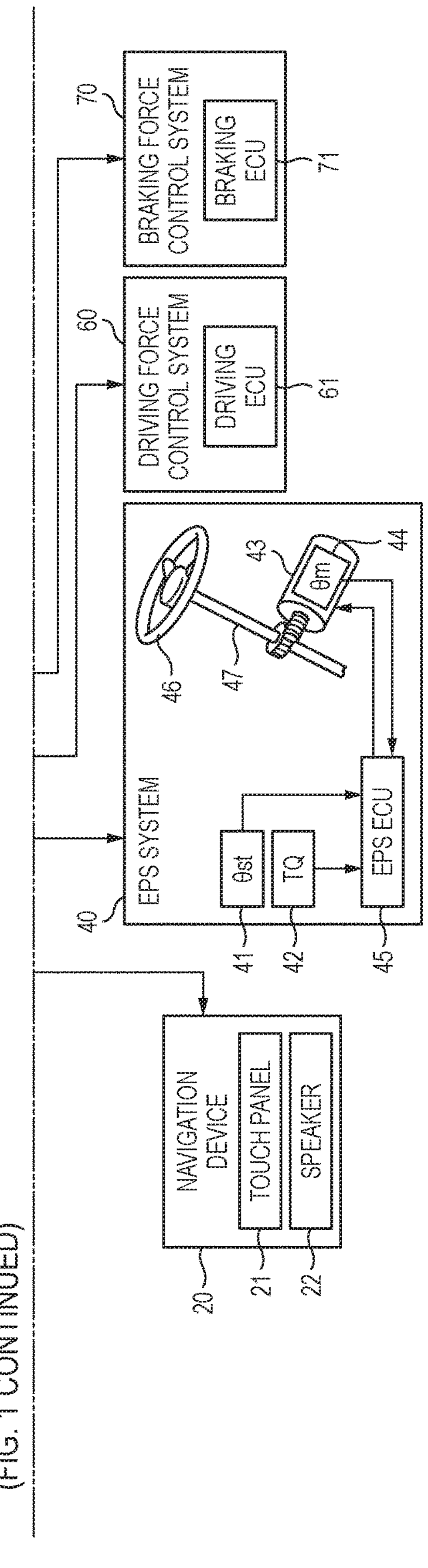
(FIG. 1 CONTINUED)
NAVIGATION DEVICE
TOUCH PANEL
SPEAKER
20
21
22
EPS SYSTEM
θst
TQ
EPS ECU
θm
40
41
42
45
46
47
43
44
DRIVING FORCE CONTROL SYSTEM
DRIVING ECU
60
61
BRAKING FORCE CONTROL SYSTEM
BRAKING ECU
70
71

FIG. 2

| TYPE OF KEY USED TO START VEHICLE | | STORAGE OF TERMINAL INFORMATION | DELETION OF TERMINAL INFORMATION |
|---|---|---|---|
| PHYSICAL KEY | | ○ | ○ |
| MAIN ELECTRONIC KEY | | ○ | ○ |
| SUB-ELECTRONIC KEY | NON-ONE-TIME KEY | ○ | × |
| | ONE-TIME KEY | × | × |

CONTROL DEVICE FOR VEHICLE

CROSS-REFERENCE RELATED APPLICATIONS

This application is based on and claims priority under 35 USC 119 from Japanese Patent Application No. 2023-011061 filed on Jan. 27, 2023, the contents of which are incorporated herein by reference.

TECHNICAL FIELD

The present disclosure relates to a control device for a vehicle.

BACKGROUND

In recent years, efforts have been actively made to provide access to a sustainable transportation system in consideration of vulnerable people among traffic participants.

In order to implement the above, the present inventors focus on research and development on further improving safety and convenience of traffic by research and development related to driving assistance techniques.

As one of the driving assistance techniques, a parking assistance technique that assists parking of a vehicle is known (for example, see Japanese Patent Publication No. 4754883).

By registering a terminal such as a smartphone to a vehicle, it becomes possible to remotely move the vehicle using that terminal. If a vehicle is shared by a plurality of users, it is necessary to consider how to register the terminal of each user to the vehicle.

The present disclosure aims to appropriately manage registration of terminals to a vehicle to improve convenience when the vehicle is shared by a plurality of users. By extension, the present disclosure contributes to development of a sustainable transportation system.

SUMMARY

One aspect of the present disclosure relates to a control device for a vehicle, the control device including:

a processor configured to start the vehicle in response to operation of one of a plurality of types of keys, in which the processor is accessible to a storage unit in which terminal information of a terminal for remotely controlling the vehicle is stored in association with the vehicle, the processor is configured to control autonomous movement of the vehicle in response to an operation of the terminal whose terminal information is stored in the storage unit, and the processor is configured to perform limitation of the terminal information in the storage unit based on the type of the key used to start the vehicle.

BRIEF DESCRIPTION OF DRAWINGS

Exemplary embodiment of the present invention will be described in detail based on the following figures, wherein:

FIG. 2 is a schematic diagram illustrating a content of management of terminal information in a storage unit by a calculation unit.

DESCRIPTION OF EMBODIMENTS

Figure 1:
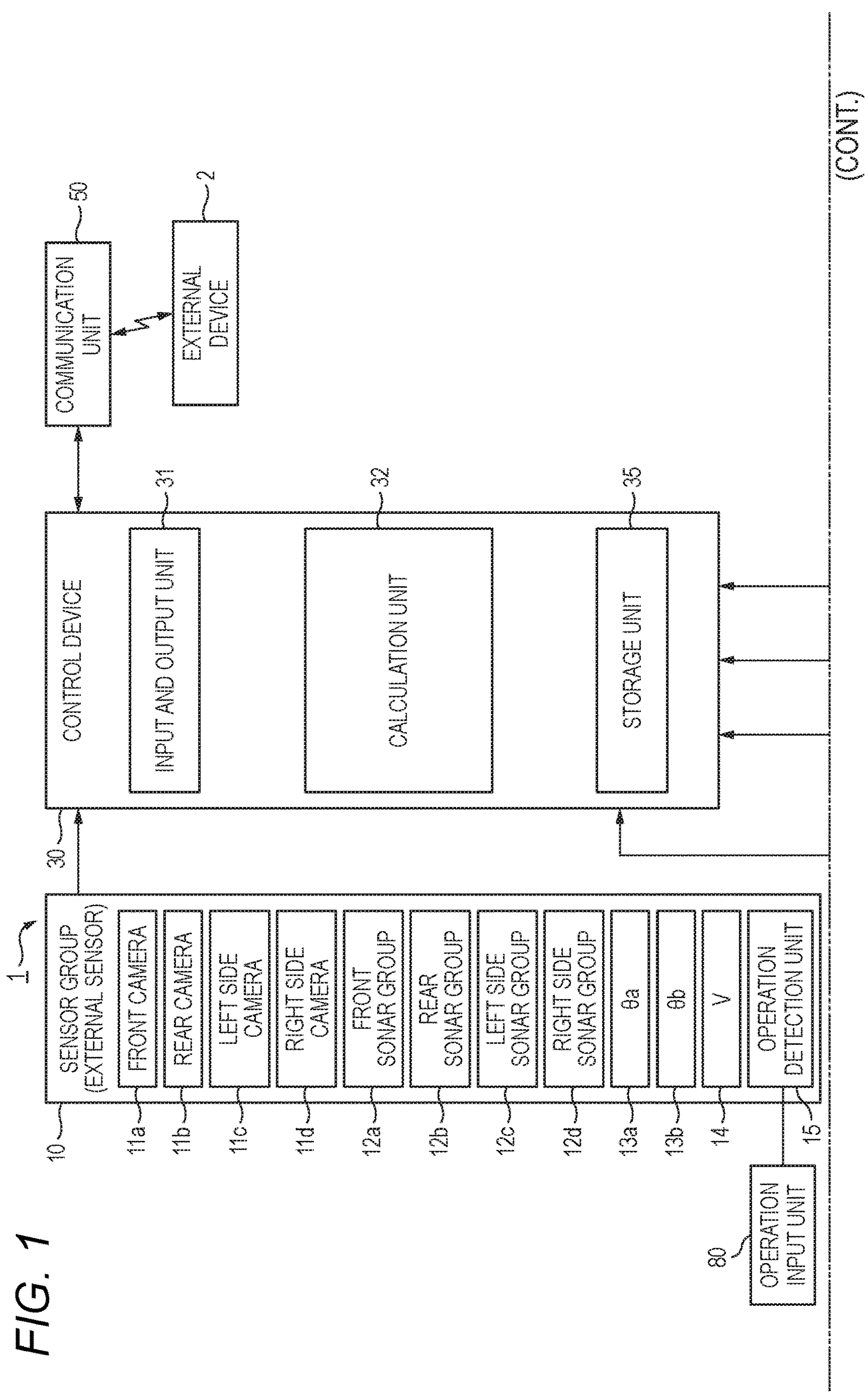
FIG. 1 is a diagram showing a vehicle controlled by a control device according to an embodiment of the present disclosure.

FIG. 1 is a diagram showing a vehicle 1 controlled by a control device according to an embodiment of the present disclosure. The vehicle 1 shown in FIG. 1 is an automobile including a drive source, and wheels (all not shown) including drive wheels driven by power of the drive source and steering wheels that are steerable. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or the four wheels including the pair of left and right front wheels and the pair of left and right rear wheels. Either one of the front wheels and the rear wheels may be steerable steering wheels, or both the front wheels and the rear wheels may be steerable steering wheels.

The vehicle 1 is movable by automated steering toward a target position specified by a user, who is an occupant of the vehicle 1.

As the target position, a position at which the vehicle 1 is parked (hereinafter also simply referred to as a "parking position") may be set. That is, the vehicle 1 is capable of being parked by automated steering to the parking position specified by the user. Hereinafter, parking by automated steering to the parking position specified by the user is also referred to as "autonomous parking".

In the vehicle 1, it is possible to select an in-vehicle parking mode or a remote parking mode as a mode of the autonomous parking. The in-vehicle parking mode is a mode in which the autonomous parking is started by the user operating a device mounted on the vehicle 1, that is, in a state where the user is in the vehicle 1. The remote parking mode is mode that allows the user to start the autonomous parking remotely by operating a terminal separate from the vehicle 1 (an external device 2 described later), that is, in a state where the user is not in the vehicle 1. When the autonomous parking is performed in the remote parking mode, the user starts an application installed on the external device 2 such as a smartphone, gets out of the vehicle, and operates the application outside the vehicle 1 to start the autonomous parking.

As shown in FIG. 1, the vehicle 1 includes a sensor group 10, a navigation device 20, a control device 30, an electric power steering system (EPS system) 40, a communication unit 50, a driving force control system 60, a braking force control system 70, and an operation input unit 80.

The sensor group 10 obtains various detection values related to the vehicle 1 or a periphery of the vehicle 1. The detection values obtained by the sensor group 10 are sent to the control device 30 and used for the autonomous parking of the vehicle 1 and the like.

The sensor group 10 includes, for example, a front camera 11*a*, a rear camera 11*b*, a left side camera 11*c*, a right side camera 11*d*, a front sonar group 12*a*, a rear sonar group 12*b*, a left side sonar group 12*c*, and a right side sonar group 12*d*. These cameras and sonar groups may function as external sensors that obtain peripheral information of the vehicle 1.

The front camera 11*a*, the rear camera 11*b*, the left side camera 11*c*, and the right side camera 11*d* output, to the control device 30, image data of peripheral images obtained by capturing images of the periphery of the vehicle 1. The peripheral images captured by the front camera 11*a*, the rear camera 11*b*, the left side camera 11*c*, and the right side camera **11*d*** are also referred to as a front image, a rear image, a left side image, and a right side image, respectively. An image formed by the left side image and the right side image is also referred to as a side image.

The front sonar group **12*a*, the rear sonar group 12*b*, the left side sonar group 12*c*, and the right side sonar group 12*d* emit sound waves to the periphery of the vehicle 1 and receive reflected sounds from other objects. The front sonar group 12*a* includes, for example, four sonars. The sonars included in the front sonar group 12*a* are respectively provided on an obliquely left front side, a front left side, a front right side, and an obliquely right front side of the vehicle 1. The rear sonar group 12*b* includes, for example, four sonars. The sonars included in the rear sonar group 12*b* are respectively provided on an obliquely left rear side, a rear left side, a rear right side, and an obliquely right rear side of the vehicle 1. The left side sonar group 12*c* includes, for example, two sonars. The sonars included in the left side sonar group 12*c* are respectively provided in the front of a left side and in the rear of the left side of the vehicle 1. The right side sonar group 12*d* includes, for example, two sonars. The sonars included in the right side sonar group 12*d* are respectively provided in the front of a right side and in the rear of the right side of the vehicle 1**.

Furthermore, the sensor group 10 includes wheel sensors **13*a* and 13*b*, a vehicle speed sensor 14, and an operation detection unit 15. The wheel sensors 13*a* and 13*b* detect rotation angles θa and θb of the wheels (not shown), respectively. The wheel sensors 13*a* and 13*b* may be implemented by angle sensors or may be implemented by displacement sensors. The wheel sensors 13*a* and 13*b* output detection pulses each time the wheels rotate at a predetermined angle. The detection pulses output from the wheel sensors 13*a* and 13*b* may be used to calculate the rotation angles and rotation speeds of the wheels. A traveling distance of the vehicle 1 may be calculated based on the rotation angles of the wheels. The wheel sensor 13*a* detects, for example, the rotation angle θa of the left rear wheel. The wheel sensor 13*b*** detects, for example, the rotation angle θb of the right rear wheel.

The vehicle speed sensor 14 detects a travel speed of a vehicle body (not shown) of the vehicle 1, that is, a vehicle speed V, and outputs the detected vehicle speed V to the control device 30. The vehicle speed sensor 14 detects the vehicle speed V based on, for example, rotation of a countershaft of a transmission.

The operation detection unit 15 detects an operation performed by the user using the operation input unit 80 and outputs information on the detected operation to the control device 30. The operation input unit 80 may include, for example, an operation button that accepts an operation to perform autonomous parking, and a device that can detect a start instruction to start the vehicle 1 in response to a user operation performed using a key described below. The operation input unit 80 and a touch panel 21, which will be described later, may be made common.

A state in which the vehicle 1 is not started refers to a state in which power supplied to devices other than specific devices such as devices necessary for detecting minimum necessary operations (for example, door unlock operation and start operation of the vehicle 1), devices necessary for communication with the outside, and devices included in a security system, is minimized, and the vehicle 1 in a hibernation state (in the case of a vehicle equipped with an engine, it also includes a state in which the engine is stopped).

The communication unit 50 is a communication interface that communicates with the external device 2 separate from the vehicle 1 under control of the control device 30. The external device 2 is an electronic device such as a smartphone, a tablet terminal, or a personal computer. In the present embodiment, as an example, the external device 2 is a smartphone owned by the user. The control device 30 may communicate with the external device 2 via the communication unit 50. For example, a mobile communication network such as a cellular line, WI-FI (registered trademark), or Bluetooth (registered trademark) may be adopted for the communication between the vehicle 1 and the external device 2. The external device 2 may be managed by, for example, a manufacturer of the vehicle 1.

The EPS system 40 includes a steering angle sensor 41, a torque sensor 42, an EPS motor 43, a resolver 44, and an EPS electronic control unit (EPS ECU) 45. The steering angle sensor 41 detects a steering angle θst of a steering 46. The torque sensor 42 detects a torque TQ applied to the steering 46.

The EPS motor 43 applies a driving force or a reaction force to a steering column 47 connected to the steering 46, thereby enabling assistance of an operation performed by the driver on the steering 46 and enabling automated steering in autonomous parking. The resolver 44 detects a rotation angle θm of the EPS motor 43. The EPS ECU 45 controls the entire EPS system 40.

The driving force control system 60 includes a driving ECU 61. The driving force control system 60 executes driving force control of the vehicle 1. The driving ECU 61 controls a driving force of the vehicle 1 by controlling an engine, a motor, or the like (not shown) based on an operation performed on an accelerator pedal (not shown) by the user or an instruction from the control device 30.

The braking force control system 70 includes a braking ECU 71. The braking force control system 70 executes braking force control of the vehicle 1. The braking ECU 71 controls a braking force of the vehicle 1 by controlling a brake mechanism or the like (not shown) based on an operation performed on a brake pedal (not shown) by the user.

The navigation device 20 detects a current position of the vehicle 1 by using, for example, a global positioning system (GPS), and shows the user a path to a destination. The navigation device 20 includes a storage device (not shown) provided with a map information database.

The navigation device 20 includes the touch panel (touch screen) 21 and a speaker 22. The touch panel 21 functions as an input device that receives input of various types of information to the control device 30 and as a display device controlled by the control device 30. That is, the user may input various commands to the control device 30 via the touch panel 21. Various screens are displayed on the touch panel 21.

The speaker 22 outputs various kinds of guidance information by voice to the user. As an example, during autonomous parking, voice guidance may be performed via the speaker 22. Specifically, when movement by automated steering toward the parking position specified by the user is started, the start of the movement of the vehicle 1 may be notified by the voice guidance via the speaker 22.

The control device 30 is a device (computer) that generally controls the entire vehicle 1. The control device 30 includes, for example, an input and output unit 31, a calculation unit 32, and a storage unit 35. The input and output unit 31 is an interface that inputs and outputs data between inside and outside of the control device 30 under control of the calculation unit 32. The storage unit 35 includes a non-volatile storage medium, such as a flash memory, and stores various types of information (for example, data and programs) for controlling an operation of the vehicle 1. The calculation unit 32 is implemented by a processor such as a central processing unit (CPU), and controls each element of the vehicle 1 by executing the programs stored in the storage unit 35 or the like.

Keys that can start the vehicle 1 include physical keys and electronic keys (virtual keys), and specifically include the following keys A, B, and C.

A: a physical key provided by the seller of the vehicle 1 to the owner of the vehicle 1

B: a main electronic key provided by the seller of the vehicle 1 to the owner of the vehicle 1

C: a sub-electronic key that can be freely issued by the owner of the vehicle 1

The physical key may include a structural key, may not include a structural key and be capable of sending a wireless signal to notify the vehicle 1 of presence of the physical key, or may include a structural key and be capable of sending the above wireless signal.

For example, when the operation input unit 80 includes a lock and the structural key of the physical key is inserted into the lock, the operation detection unit 15 detects the start operation and sends a start instruction to the control device 30. The operation input unit 80 may include a start button, and the operation detection unit 15 may detect the start operation when it is detected that the start button is pressed while the communication unit 50 receives a wireless signal sent from the physical key, for example, and may send a start instruction to the control device 30. Upon receiving this start instruction, the calculation unit 32 of the control device 30 starts power supply to each unit and starts the vehicle 1. The operation of inserting the physical key into the lock and the operation of pressing the start button while holding the physical key constitute an operation for starting the vehicle 1.

The electronic key is managed by an application installed on the external device 2 owned by the user who is provided with the electronic key. The user who is provided with the electronic key sends information of the electronic key to the control device 30 via the communication unit 50 by operating an application on the external device 2 that the user owns. When the calculation unit 32 of the control device 30 receives the information of the electronic key via the communication unit 50, the calculation unit 32 receives a start instruction to start the vehicle 1, starts power supply to each unit, and starts the vehicle 1. The operations of the application for sending the electronic key are included in an operation for starting the vehicle 1.

Note that the above-described application may store the information of the electronic key in a wireless tag installed in the external device 2. In this case, when the wireless tag of the external device 2 owned by the user who is provided with the electronic key approaches a wireless tag reader included in the communication unit 50, the information of the electronic key may be sent to the control device 30 via the communication unit 50. In this case, the operation of bringing the wireless tag closer to the wireless tag reader is included in an operation for starting the vehicle 1.

The owner of the vehicle 1 can issue a sub-electronic key using an application installed on the external device 2 or the like. As the sub-electronic key, it is possible to issue a one-time key with an expiration date and a non-one-time key without an expiration date.

The one-time key is issued, for example, by an owner of the vehicle 1 for use in a car sharing service, to a user of the car sharing service. The non-one-time key is issued, for example, by the owner of the vehicle 1 to his or her family or friends when sharing the vehicle 1 with them.

The calculation unit 32 of the control device 30 performs the parking assistance control for autonomously parking the vehicle 1 to a target position (parking position). For example, the calculation unit 32 executes the parking assistance control when receiving an operation for executing autonomous parking via the input and output unit 31 or the like. The parking assistance control performed by the calculation unit 32 includes first parking assistance control performed in the remote parking mode and second parking assistance control performed in the in-vehicle parking mode.

The calculation unit 32 controls a display device (here, the touch panel 21) provided in the vehicle 1. For example, the calculation unit 32 may display an autonomous parking-related screen on the touch panel 21 in response to receiving the operation for executing the autonomous parking. The user sets the parking position on this autonomous parking-related screen.

When the user wants to start the autonomous parking in the in-vehicle parking mode, the user operates this autonomous parking-related screen and inputs a start instruction for autonomous parking to the control device 30. Upon receiving this start instruction, the calculation unit 32 starts executing the second parking assistance control. When the user wants to start the autonomous parking in the remote parking mode, the user performs a necessary operation by referring to a procedure for transitioning to the remote parking mode displayed on the autonomous parking-related screen.

For example, the user shifts the vehicle 1 to parking, starts the application on the external device 2, gets out of the vehicle 1, locks doors, and then operates the application to input the start instruction for autonomous parking to the control device 30. The calculation unit 32 receives this start instruction and starts executing the first parking assistance control.

When the user starts autonomous parking in the remote parking mode for the first time, it is necessary to perform processing (hereinafter also referred to as user registration) of registering information of the external device 2 (for example, device identification information or information that identifies the user) owned by the user in association with the vehicle 1. User registration is performed in the following procedure as an example, although it is not particularly limited.

The calculation unit 32 causes a two-dimensional code indicating information necessary for user registration (information necessary for communication authentication between the vehicle 1 and the external device 2 or the like) to be displayed on the autonomous parking-related screen displayed on the touch panel 21, and instructs the user to read this two-dimensional code with the external device 2. The user starts the application on the external device 2 that he or she owns, and reads the two-dimensional code using the application. The application of the external device 2 sends the terminal information of the external device 2 to the control device 30 via the communication unit 50 based on the information obtained from the two-dimensional code. Upon receiving the terminal information from the external device 2, the calculation unit 32 stores the terminal information in the storage unit 35 in association with the information of the vehicle 1.

Through the above-described processing, the external device 2 whose terminal information is stored in the storage unit 35 can start autonomous parking of the vehicle 1 (first parking assistance control) by operating the application. Note that the calculation unit 32 may store the terminal information of the external device 2 in a storage unit of an external server, instead of the storage unit 35, in association with the information of the vehicle 1.

The calculation unit 32 performs management (limitation) of the terminal information in the storage unit 35 based on the type of the key used to start the vehicle 1. FIG. 2 is a schematic diagram illustrating a content of the management of the terminal information in the storage unit 35 by the calculation unit 32.

As shown in FIG. 2, when the key used to start the vehicle 1 is a physical key or a main electronic key, the calculation unit 32 enables storage of the terminal information of the external device 2 in the storage unit 35 (that is, permits user registration), and enables deletion of the terminal information of the external device 2 stored in the storage unit 35.

When the key used to start the vehicle 1 is a non-one-time key, the calculation unit 32 enables storage of the terminal information of the external device 2 in the storage unit 35 (permits user registration), and disables deletion of the terminal information of the external device 2 stored in the storage unit 35.

Note that when the non-one-time key is issued, it may be possible to set whether to enable or disable user registration of the non-one-time key. In this case, when the key used to start the vehicle 1 is a non-one-time key that is set to disable user registration, the calculation unit 32 disables storage of the terminal information of the external device 2 in the storage unit 35, and disables deletion of the terminal information of the external device 2 stored in the storage unit 35. When the key used to start the vehicle 1 is a non-one-time key that is set to enable user registration, the calculation unit 32 enables storage of the terminal information of the external device 2 in the storage unit 35, and disables deletion of the terminal information of the external device 2 stored in the storage unit 35.

When the key used to start the vehicle 1 is a one-time key, the calculation unit 32 disables storage of the terminal information of the external device 2 in the storage unit 35 (prohibits user registration), and disables deletion of the terminal information of the external device 2 stored in the storage unit 35.

As described above, the control device 30 of the vehicle 1 manages authorities such as permission for user registration and cancellation of registration of the external devices 2 that is already registered, based on the type of the key used to start the vehicle 1. In this way, the owner of the vehicle 1 who owns the physical key or the main electronic key can easily manage the external device 2 registered in the vehicle 1.

A user who owns a non-one-time key cannot cancel registration of an already registered external device 2, but can register the external device 2 in the vehicle 1. Therefore, a user who owns the non-one-time key can enjoy the autonomous parking function using the external device 2. For the owner of the vehicle 1, the terminal information of the external device 2 that the owner owns will not be deleted by the user who owns the non-one-time key. Therefore, it is possible to prevent a situation where autonomous parking cannot be performed immediately in the remote parking mode.

A user who owns a one-time key cannot register the external device 2 or cancel the registration of an already registered external device 2. The user who owns the one-time key does not use the vehicle 1 frequently, and therefore is likely not accustomed to autonomous parking. By disabling such a user from registering the external device 2, it is possible to prevent the autonomous parking function from being used in an unfamiliar state. For the owner of the vehicle 1, the terminal information of the external device 2 that the owner owns and the terminal information of the external device 2 that a family member or a friend owns will not be deleted by the user who owns the one-time key. Therefore, it is possible to prevent a situation where autonomous parking cannot be performed immediately in the remote parking mode when the owner, his or her family, or the like want to perform autonomous parking.

Although an embodiment of the present disclosure has been described above with reference to the accompanying drawings, it is needless to say that the present disclosure is not limited to the embodiment. It is apparent that those skilled in the art can conceive of various modifications and changes within the scope described in the claims, and it is understood that such modifications and changes naturally fall within the technical scope of the present invention. In addition, the respective constituent elements in the above-described embodiment may be combined as desired without departing from the gist of the invention.

For example, in the above-described embodiment, a four-wheeled automobile was used as an example of the vehicle, but the present invention is not limited thereto. The vehicle to which the technique of the present disclosure is applicable may be a two-wheeled automobile (so-called motorcycle), a Segway (registered trademark), or the like.

In the present description, at least the following matters are described. Although corresponding constituent elements or the like in the above-described embodiment are shown in parentheses, the present invention is not limited thereto.

(1) A control device (control device 30) for a vehicle (vehicle 1), the control device including:

a processor (calculation unit 32) configured to start the vehicle in response to operation (inserting a physical key, pressing a start button while holding the physical key, and input operation of key information of an electronic key (touching the external device 2, sending the key information by operating an application, or the like)) of one of a plurality of types of keys, in which the processor is accessible to a storage unit (storage unit 35 or a storage unit of an external server) in which terminal information of a terminal (external device 2) for remotely controlling the vehicle is stored in association with the vehicle, the processor is configured to control autonomous movement of the vehicle in response to an operation of the terminal whose terminal information is stored in the storage unit (first parking assistance control), and the processor is configured to perform limitation of the terminal information in the storage unit based on the type of the key used to start the vehicle.

According to (1), for example, when the vehicle is started using a physical key which is always provided for each vehicle, there is no limit on storing or deleting the terminal information in the storage unit, and when the vehicle is started using an electronic key (sub-electronic key) that can be freely issued by the vehicle owner, by setting limits on storing and deleting the terminal information in the storage unit, it becomes possible to allow only specific users other than the owner (family members or friends) to remotely control the vehicle, or to prevent users other than the owner from deleting the terminal information of the owner. In this way, by being able to manage the information in the storage unit based on the type of the key, it is possible to improve convenience when a plurality of users use the vehicle.

(2) The control device for a vehicle according to (1), in which the keys include a first key of a first type (physical key, main electronic key, sub-electronic key (non-one-time key)) and a second key of a second type (sub-electronic key (one-time key)), and the processor is configured to enable storage of the terminal information in the storage unit when the vehicle is started in response to an operation of the first key, and disable storage of the terminal information in the storage unit when the vehicle is started in response to an operation of the second key.

According to (2), a user who uses the first key can store the terminal information of the terminal that he or she owns in the storage unit, so that the user can remotely control the vehicle using the terminal. On the other hand, a user who uses the second key is unable to store the terminal information in the storage unit, and therefore cannot remotely control the vehicle using the terminal that he or she owns. In this way, it is possible to manage whether to enable or disable remote control by the user, and it is possible to improve convenience and safety when a plurality of users use the vehicle.

(3) The control device for a vehicle according to (2), in which the processor is configured to disable deletion of the terminal information stored in the storage unit when the vehicle is started in response to an operation of the second key.

According to (3), the user using the second key cannot delete the terminal information stored in the storage unit. Therefore, it is possible to prevent information in the storage unit from being deleted unnecessarily, and it is possible to improve convenience and safety when a plurality of users use the vehicle.

(4) The control device for a vehicle according to (2) or (3), in which the first key has no expiration date, and the second key has an expiration date.

According to (4), a user who uses the second key with an expiration date can be limited in storing or deleting information in the storage unit. For example, when using a vehicle for car sharing, the user cannot edit the information in the storage unit, so that an administrator of the vehicle can easily manage the vehicle even when a plurality of unspecified users use the vehicle.

(5) The control device for a vehicle according to (1), in which the keys include a third key of a third type (physical key, main electronic key) and a fourth key of a fourth type (sub-electronic key), and the processor is configured to enable deletion of the terminal information stored in the storage unit when the vehicle is started in response to an operation of the third key, and disable deletion of the terminal information stored in the storage unit when the vehicle is started in response to an operation of the fourth key.

According to (5), a user who uses the third key can, for example, delete terminal information of a terminal owned by another person from the storage unit. A user using the fourth key can be limited in deleting information from the storage unit. Therefore, even when a plurality of unspecified users use the vehicle, an administrator of the vehicle can easily manage the vehicle.

(6) The control device for a vehicle according to (5), in which the processor is configured to enable storage of the terminal information in the storage unit when the vehicle is started in response to an operation of the third key.

According to (6), the user using the third key can both store and delete the terminal information in the storage unit, and therefore it is possible to remotely control the vehicle using a terminal, and it is also possible to easily manage the vehicle even when a plurality of unspecified users use the vehicle.

(7) The control device for a vehicle according to (6), in which the third key is provided by a seller of the vehicle, and the fourth key is issuable by an owner of the vehicle.

According to (7), the owner of the vehicle can limit a user who uses the fourth key issued by the owner himself or herself in deletion of information from the storage unit. Therefore, the owner can easily manage the vehicle.

The invention claimed is:

1. A control device for a vehicle, the control device comprising:

a processor configured to start the vehicle in response to operation of one of a plurality of types of keys, wherein the processor is accessible to a memory in which terminal information for a terminal allowed to remotely control autonomous movement of the vehicle is stored in association with the vehicle, the processor is configured to control the autonomous movement of the vehicle in response to an operation of the terminal whose terminal information is stored in the memory, the processor is configured to perform limitation of the terminal information in the memory based on the type of the key used to start the vehicle, the keys include a first key of a first type and a second key of a second type, and the processor is configured to enable storage of the terminal information in the memory when the vehicle is started in response to an operation of the first key, and disable storage of the terminal information in the memory when the vehicle is started in response to an operation of the second key.

2. The control device for a vehicle according to claim 1, wherein the processor is configured to disable deletion of the terminal information stored in the memory when the vehicle is started in response to an operation of the second key.

3. The control device for a vehicle according to claim 1, wherein the first key has no expiration date, and the second key has an expiration date.

4. The control device for a vehicle according to claim 1, wherein the keys include a third key of a third type and a fourth key of a fourth type, and the processor is configured to enable deletion of the terminal information stored in the memory when the vehicle is started in response to an operation of the third key, and disable deletion of the terminal information stored in the memory when the vehicle is started in response to an operation of the fourth key.

5. The control device for a vehicle according to claim 4, wherein the processor is configured to enable storage of the terminal information in the memory when the vehicle is started in response to an operation of the third key.

6. The control device for a vehicle according to claim 5, wherein the third key is provided by a seller of the vehicle, and the fourth key is issuable by an owner of the vehicle.

7. A control device for a vehicle, the control device comprising:

a processor configured to start the vehicle in response to operation of one of a plurality of types of keys, the keys including a first key of a first type and a second key of a second type, wherein the processor is accessible to a memory in which terminal information of a terminal for remotely controlling the vehicle is stored in association with the vehicle, the processor is configured to control autonomous movement of the vehicle in response to an operation of the terminal whose terminal information is stored in the memory, the processor is configured to perform limitation of the terminal information in the memory based on the type of the key used to start the vehicle, and the processor is configured to enable storage of the terminal information in the memory when the vehicle is started in response to an operation of the first key, and disable storage of the terminal information in the memory when the vehicle is started in response to an operation of the second key.

8. A control device for a vehicle, the control device comprising:

a processor configured to start the vehicle in response to operation of one of a plurality of types of keys, the keys including a third key of a third type and a fourth key of a fourth type, wherein the processor is accessible to a memory in which terminal information of a terminal for remotely controlling the vehicle is stored in association with the vehicle, the processor is configured to control autonomous movement of the vehicle in response to an operation of the terminal whose terminal information is stored in the memory, the processor is configured to perform limitation of the terminal information in the memory based on the type of the key used to start the vehicle, and the processor is configured to enable deletion of the terminal information stored in the memory when the vehicle is started in response to an operation of the third key, and disable deletion of the terminal information stored in the memory when the vehicle is started in response to an operation of the fourth key.

* * * * *